US012647520B2

(12) United States Patent
Young et al.

(10) Patent No.: US 12,647,520 B2
(45) Date of Patent: Jun. 2, 2026

(54) VIRTUAL TELEPHONY PLATFORM FOR SECURE COMMUNICATION

(71) Applicant: Perfecta Federal, LLC, Springfield, VA (US)

(72) Inventors: Chris Young, Springfield, VA (US); George Zoulias, Springfield, VA (US)

(73) Assignee: Perfecta Federal, LLC, Springfield, VA (US)

( * ) Notice: Subject to any disclaimer, the term of this patent is extended or adjusted under 35 U.S.C. 154(b) by 258 days.

(21) Appl. No.: 18/217,405

(22) Filed: Jun. 30, 2023

(65) Prior Publication Data

US 2024/0364816 A1 Oct. 31, 2024

Related U.S. Application Data

(60) Provisional application No. 63/462,820, filed on Apr. 28, 2023.

(51) Int. Cl.
| | |
|---|---|
| *H04W 64/00* | (2009.01) |
| *H04M 7/00* | (2006.01) |
| *H04W 8/18* | (2009.01) |

(52) U.S. Cl.
CPC ......... *H04M 7/0087* (2013.01); *H04W 8/183* (2013.01); *H04W 64/00* (2013.01)

(58) Field of Classification Search
CPC .... H04W 64/00; H04W 8/183; H04M 7/0087
See application file for complete search history.

(56) References Cited

U.S. PATENT DOCUMENTS

| | | | | |
|---|---|---|---|---|
| 8,965,366 | B1 * | 2/2015 | Somayajula | .......... H04W 60/00 455/418 |
| 2015/0057044 | A1 | 2/2015 | Altman | |
| 2015/0304506 | A1 * | 10/2015 | Zhu | ....................... H04W 8/205 455/406 |
| 2016/0007190 | A1 * | 1/2016 | Wane | .................... H04W 84/042 |
| 2017/0134298 | A1 * | 5/2017 | Walke | .................... H04M 17/10 |
| 2017/0289788 | A1 * | 10/2017 | Lalwaney | ............... H04W 8/24 |
| 2017/0289894 | A1 * | 10/2017 | Palm | ..................... H04W 76/14 |
| 2017/0332273 | A1 * | 11/2017 | Link, II | ............ H04W 28/0268 |
| 2018/0027603 | A1 * | 1/2018 | Lee | ........................ H04W 48/16 370/329 |
| 2018/0077152 | A1 * | 3/2018 | Lipovkov | ........... H04L 63/0853 |

(Continued)

*Primary Examiner* — Benjamin H Elliott, IV
(74) *Attorney, Agent, or Firm* — Conley Rose, P.C.

(57) ABSTRACT

A virtual telephony platform may establish at least one communication connection with one or more multiple modem array devices that are deployed in one or more geographical regions. The platform may be provided with access to multiple Subscriber Identity Modules (SIMs). The platform may provision a unique device profile to a particular modem in a specific modem array device deployed in a particular geographical region through a communication connection. The platform may further provide the particular modem with a specific SIM profile of a particular SIM of the multiple SIMs through the corresponding communication connection, such that the particular modem is configured to use the specific SIM profile to access a base station of a wireless carrier in the particular region. The platform may further route telecommunication data between a client device and the wireless carrier network in the particular region through the particular modem.

19 Claims, 5 Drawing Sheets

(56)                 References Cited

U.S. PATENT DOCUMENTS

| | | | |
|---|---|---|---|
| 2019/0268755 A1* | 8/2019 | Namiranian | H04W 8/183 |
| 2021/0345219 A1* | 11/2021 | Watts, Jr. | H04W 88/16 |
| 2022/0046408 A1* | 2/2022 | Kang | H04W 8/183 |
| 2022/0124481 A1* | 4/2022 | Kang | H04W 12/45 |
| 2022/0159448 A1* | 5/2022 | Kang | H04W 8/22 |
| 2022/0174639 A1* | 6/2022 | Lucioni | H04M 15/7556 |
| 2022/0182317 A1* | 6/2022 | Thoria | H04L 45/04 |
| 2022/0248231 A1* | 8/2022 | Paetsch | H04W 12/45 |
| 2022/0311744 A1* | 9/2022 | Shevade | G06F 9/45558 |
| 2024/0364816 A1* | 10/2024 | Young | H04W 64/00 |

* cited by examiner

POWER SOURCE 202

ANTENNAS 204

MODEMS 206

USER INTERFACE 208

PROCESSORS 210

MEMORY 212

OPERATING SYSTEM 214

DEVICE SOFTWARE 216

DEVICE PROFILE DATA STORE 218

SIM PROFILES DATA STORE 220

MODEM ARRAY DEVICE

200

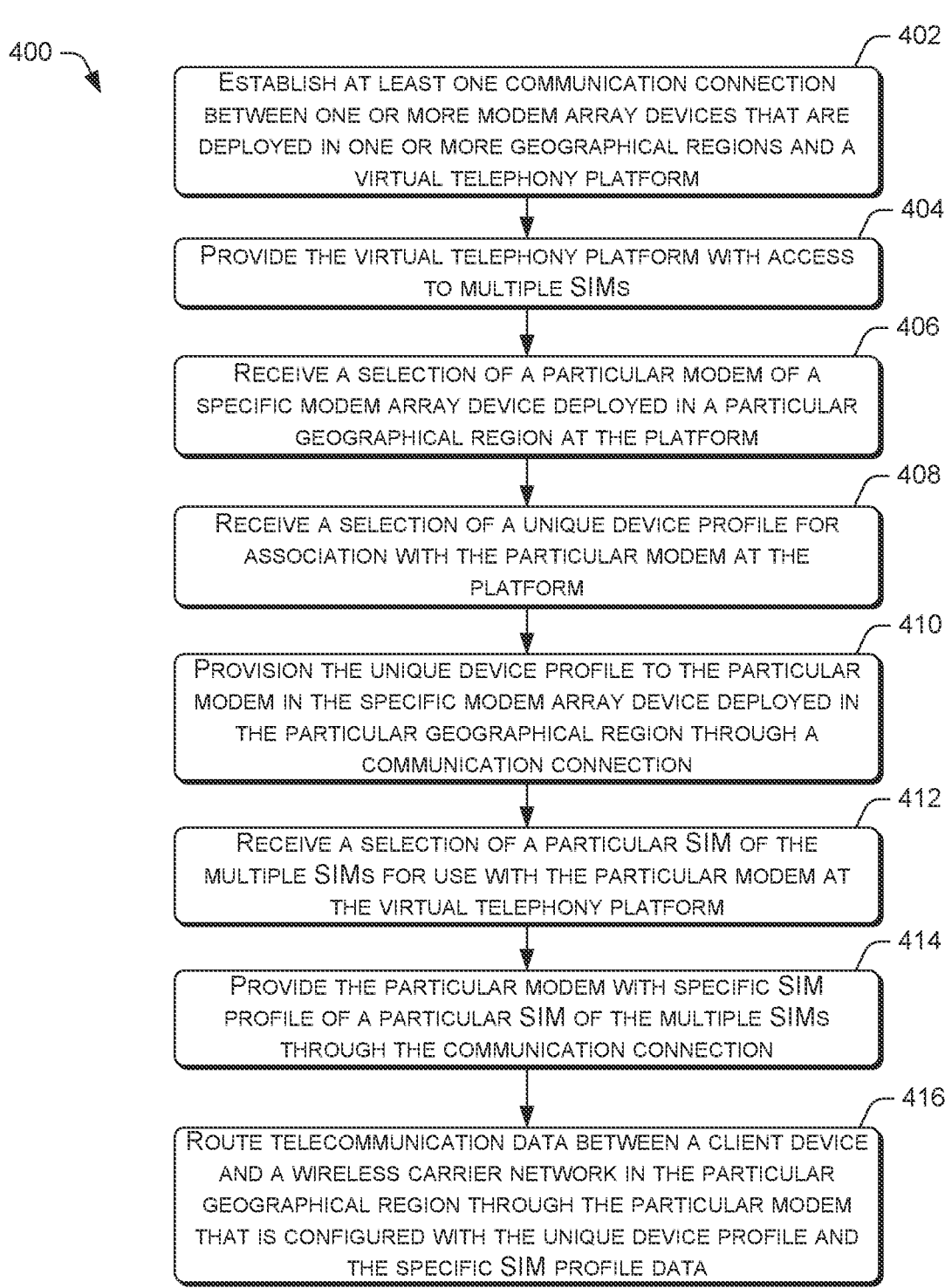

400

402
ESTABLISH AT LEAST ONE COMMUNICATION CONNECTION BETWEEN ONE OR MORE MODEM ARRAY DEVICES THAT ARE DEPLOYED IN ONE OR MORE GEOGRAPHICAL REGIONS AND A VIRTUAL TELEPHONY PLATFORM

404
PROVIDE THE VIRTUAL TELEPHONY PLATFORM WITH ACCESS TO MULTIPLE SIMs

406
RECEIVE A SELECTION OF A PARTICULAR MODEM OF A SPECIFIC MODEM ARRAY DEVICE DEPLOYED IN A PARTICULAR GEOGRAPHICAL REGION AT THE PLATFORM

408
RECEIVE A SELECTION OF A UNIQUE DEVICE PROFILE FOR ASSOCIATION WITH THE PARTICULAR MODEM AT THE PLATFORM

410
PROVISION THE UNIQUE DEVICE PROFILE TO THE PARTICULAR MODEM IN THE SPECIFIC MODEM ARRAY DEVICE DEPLOYED IN THE PARTICULAR GEOGRAPHICAL REGION THROUGH A COMMUNICATION CONNECTION

412
RECEIVE A SELECTION OF A PARTICULAR SIM OF THE MULTIPLE SIMs FOR USE WITH THE PARTICULAR MODEM AT THE VIRTUAL TELEPHONY PLATFORM

414
PROVIDE THE PARTICULAR MODEM WITH SPECIFIC SIM PROFILE OF A PARTICULAR SIM OF THE MULTIPLE SIMs THROUGH THE COMMUNICATION CONNECTION

416
ROUTE TELECOMMUNICATION DATA BETWEEN A CLIENT DEVICE AND A WIRELESS CARRIER NETWORK IN THE PARTICULAR GEOGRAPHICAL REGION THROUGH THE PARTICULAR MODEM THAT IS CONFIGURED WITH THE UNIQUE DEVICE PROFILE AND THE SPECIFIC SIM PROFILE DATA

FIG. 4

500 ⟍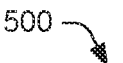

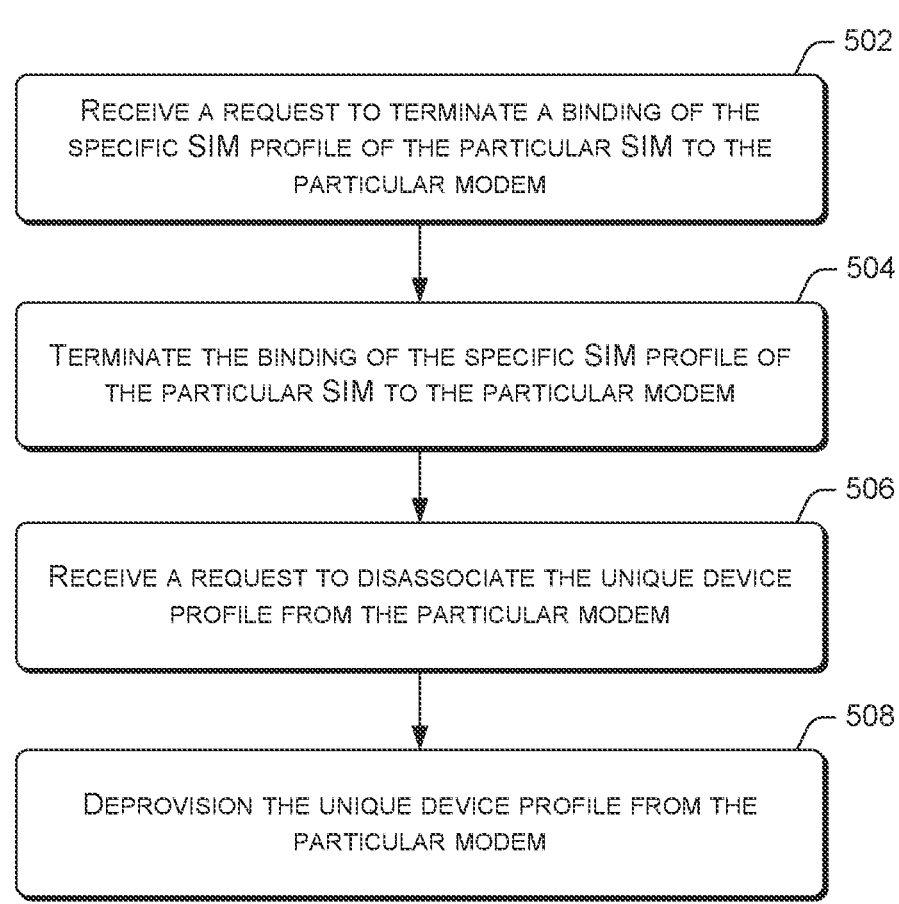

502

RECEIVE A REQUEST TO TERMINATE A BINDING OF THE SPECIFIC SIM PROFILE OF THE PARTICULAR SIM TO THE PARTICULAR MODEM

504

TERMINATE THE BINDING OF THE SPECIFIC SIM PROFILE OF THE PARTICULAR SIM TO THE PARTICULAR MODEM

506

RECEIVE A REQUEST TO DISASSOCIATE THE UNIQUE DEVICE PROFILE FROM THE PARTICULAR MODEM

508

DEPROVISION THE UNIQUE DEVICE PROFILE FROM THE PARTICULAR MODEM

FIG. 5

VIRTUAL TELEPHONY PLATFORM FOR SECURE COMMUNICATION

CROSS-REFERENCE TO RELATED PATENT APPLICATION

This application claims priority to U.S. Provisional Patent Application No. 63/462,820, filed on Apr. 28, 2023, entitled "Virtual Telephony Platform for Secure Communication," which is hereby incorporated by reference in its entirety.

BACKGROUND

A virtual phone, also referred to as a softphone, is a software application for making telephone calls over the Internet using a general-purpose computing device rather than dedicated landlines or mobile telephone hardware. For example, the softphone software may be installed on a desktop computer, a laptop computer, or some other computing device to enable a user to place and receive phone calls. However, a softphone generally does not have integrated functions that enable a user to use data services from within the softphone, such as browsing the Internet, accessing email and instant messaging services, and/or interacting with online social media websites.

Furthermore, while the use of a softphone may provide the user with some protection from organizations that monitor call activities and online activities of users, the use of a softphone may nevertheless leave online or network digital signatures that can be traced, monitored, and/or analyzed by such organizations.

SUMMARY

Described herein are techniques for providing a virtual telephony platform that enables users to engage in telecommunication activities using virtual phones while protecting such users from experiencing unlawful interception, interference, or harassment as a result of such telecommunication activities. For example, the telecommunication activities of a user may include placing or receiving voice telephone calls, browsing the Internet, accessing email and instant messaging services, interacting with online social media websites, and/or so forth. In various embodiments, the virtual telephony platform may make use of one or more wireless devices that may consist of one or multiple radio emitters (referred to herein as modem array devices) that are deployed either fixed or mobile in one or more geographical regions (e.g., cities, states, countries, and/or so forth) based on a request of a user. The user may be an individual or an entity that is composed of multiple individual members. A modem array device is a device that is equipped with multiple cellular modems. Each of the cellular modems is configured to use various radio access technologies (e.g., (Long-Term Evolution (LTE), 5G, etc.) to communicatively interact with the cellular base stations of wireless carrier networks in a geographical region. As a part of the deployment, each modem array device may be networked to the virtual telephony platform via a communication connection. In various embodiments, the communication connection is a secure connection, such as a virtual private network (VPN) connection.

The user may designate a particular set of subscriber identity modules (SIMs) for use with the one or more modem array devices to the virtual telephony platform. In various embodiments, the set of SIMs may include physical SIM cards that are purchased from SIM card vendors, virtual SIMs (e.g., eSIMs) that are purchased from virtual SIM vendors, or a combination of both physical SIM cards and virtual SIMs. In some embodiments, an operator of the virtual telephony platform may procure the particular set of SIMs on behalf of a user. Each of the SIMs may include a SIM profile that is associated with a subscriber account established with a particular wireless carrier network (i.e., a Home Public Land Mobile Network (HPLMN)). Accordingly, the SIM profile may enable the user to access and use the telecommunication services provided by the HPLMN, as well as access and use telecommunication services provided by various other wireless carrier networks (i.e., Visited Public Land Mobile Networks (VPLMNs)) around the globe. For example, the particular set of SIMs may include SIM profiles that are associated with subscriber accounts established with a single HPLMN, multiple HPLMNs in the same geographical region (e.g., country), or multiple HPLMNs in different geographical regions (e.g., different countries). Each SIM profile may store SIM profile data that is unique to the SIM profile. For example, the SIM profile data in a SIM profile may include a unique International Mobile Subscriber Identity (IMSI), subscriber authentication information, preferences, device characteristics, and settings for carrier access and services, and/or so forth.

In various embodiments, the virtual telephony platform may store the particular set of SIMs associated with the user in a dedicated SIM bank device for use by the user. For example, for physical SIM cards, the SIM bank device may include a plurality of SIM slots for accepting and communicatively coupling the physical SIM cards to the SIM bank device via electrically conductive connections. Accordingly, the SIM bank device may access and download the SIM profiles from the physical SIM cards. With respect to virtual SIMs, the SIM bank device may receive a transfer of the virtual SIMs from a computing device of the virtual SIM vendor over a network. In turn, the SIM bank device may store the SIM profiles of the virtual SIMs in a memory of the SIM bank device.

In various embodiments, the virtual telephony platform may configure a particular modem of a modem array device and a specific SIM profile into a virtual phone for use by the user. The particular modem and the specific SIM profile may be selected by the user via an application user interface that is provided by the virtual telephony platform. In such embodiments, the virtual telephony platform may use a communication connection to the modem array device to provision the particular modem with a unique device profile that identifies the particular modem as a specific mobile telecommunication device to a wireless carrier network. In this way, the particular modem may be bound to the unique device profile. For example, the unique device profile may include an International Mobile Equipment Identity (IMEI), a device serial number, a device manufacturer identifier, a device model identifier, and/or so forth. The unique device profile may be selected by the user or the virtual telephony platform for provisioning to the particular modem. The virtual telephony platform may further retrieve the specific SIM profile from the SIM bank device and provide the SIM profile to the particular modem via the communication connection such that the particular modem is able to use the specific SIM to access a base station of a wireless carrier network in the geographical region to which the modem array device is deployed.

Subsequently, the virtual telephony platform may route telecommunication data between a client device and the wireless carrier network through the virtual phone that includes the particular modem of the modem array device.

The client device may be located in a different geographical region than the geographical region to which the modem array device is deployed. For example, the client device may be located in New York City, while the modem array device may be located in Frankfurt, Germany. The client device may be connected to the virtual telephony platform via a secure communication connection, such as a VPN connection. The telecommunication data may include voice communication data, instant messaging data, email communication data, web data, and/or so forth. The telecommunication data may be sent and received by customized software applications that are configured to route the telecommunication data via the virtual telephony platform and the particular modem to the wireless carrier network in the geographical region where the particular modem is located. For example, the customized software applications may include a Voice over Internet Protocol (VOIP) telephony application for making and receiving telephone calls, a web browser for browsing the web, blogging to websites, uploading data to websites, and downloading data from websites, an email client application for accessing emails, an instant messaging client application for messaging, and/or so forth. In this way, a user may use the virtual telephony platform to obscure a true geographical location of the user and manifest the user as being located in a different geographical region as the user engages in telecommunication activities via a virtual phone.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 4 is a flow diagram of an example process for using the virtual telephony platform to configure a particular modem of a modem array device and a specific SIM profile into a virtual phone for use by a user.

FIG. 5 is a flow diagram of an example process for deprovisioning a virtual phone by dissociating components of the virtual phone via the virtual telephony platform.

DETAILED DESCRIPTION

Described herein are techniques for providing a virtual telephony platform that enables users to engage in telecommunication activities using virtual phones while protecting such users from experiencing unlawful interception, interference, or harassment as a result of such telecommunication activities. For example, the telecommunication activities may include placing or receiving voice telephone calls, browsing the Internet, accessing email and instant messaging services, interacting with online social media websites, and/or so forth.

In various embodiments, a virtual telephony platform may establish at least one communication connection with one or more multiple modem array devices that are deployed in one or more geographical regions. The platform may be provided with access to multiple Subscriber Identity Modules (SIMs) that are configured to access wireless carrier networks. The platform may provision a unique device profile to a particular modem in a specific modem array device deployed in a particular geographical region through a communication connection. The platform may further provide the particular modem with a specific SIM profile of a particular SIM of the multiple SIMs through the corresponding communication connection, such that the particular modem is configured to use the specific SIM profile to access a base station of a wireless carrier in the particular region. The platform may further route telecommunication data between a client device and the wireless carrier network in the particular region through the particular modem that is configured with the unique device profile and the specific SIM profile data.

The virtual telephony platform may enable a user that is engaged in telecommunication activities to obscure a true geographical location of the user and manifest the user as being located in a different geographical region. Accordingly, the user who is engaged in such telecommunication activities may be protected from unlawful interception, interference, or harassment. The techniques described herein may be implemented in a number of ways. Example implementations are provided below with reference to the following figures.

Example Architecture

Figure 1:
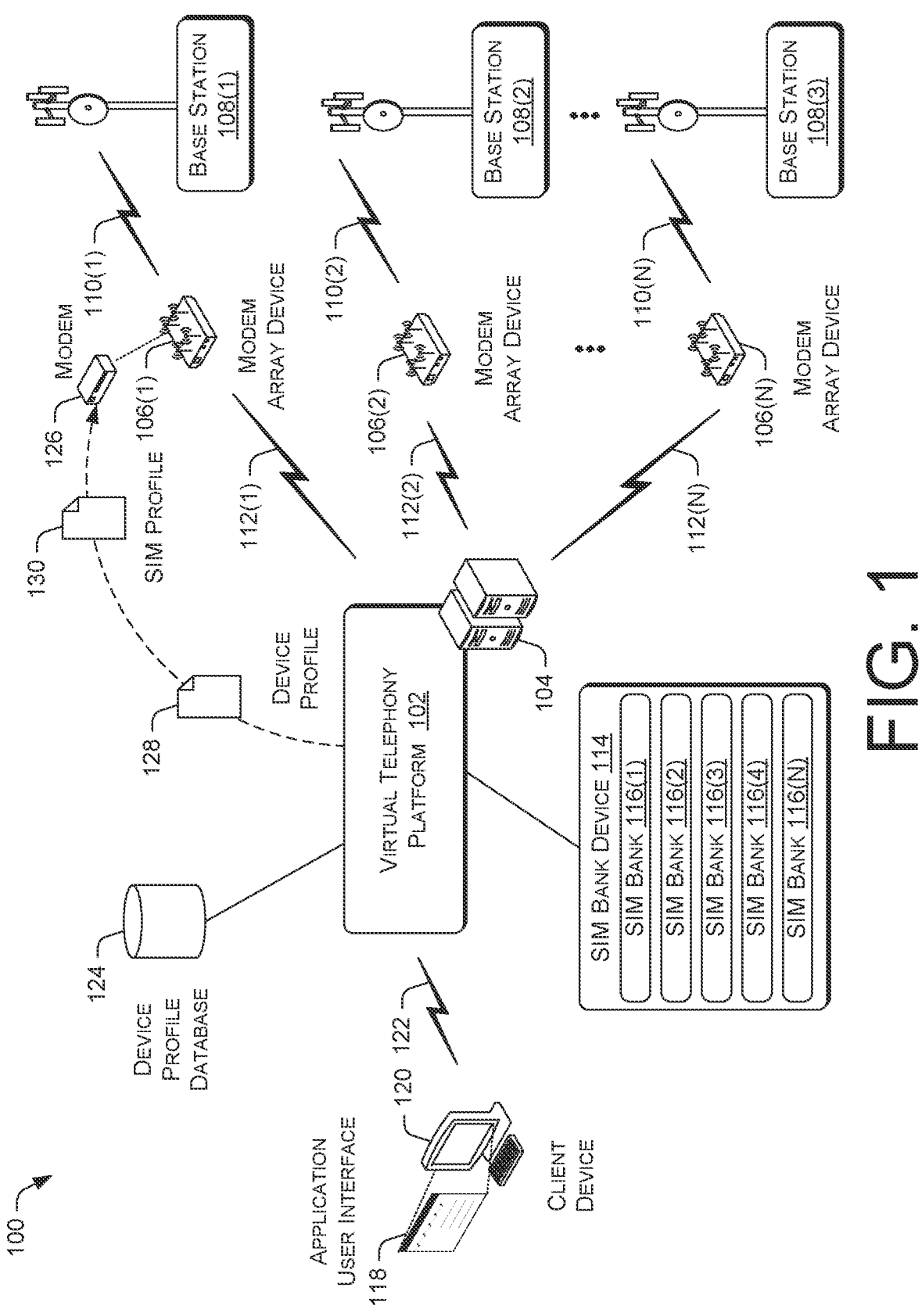
FIG. 1 illustrates an example architecture of a virtual telephony platform that enables users to engage in secured telecommunication activities without revealing their geographical locations and identities.

FIG. 1 illustrates an example architecture 100 of a virtual telephony platform that enables users to engage in secured telecommunication activities without revealing their geographical locations and identities. The architecture 100 may include a virtual telephony platform 102 that is executed by one or more computing nodes 104. The virtual telephony platform 102 may be operated by a virtual telephony service provider that provides virtual phone services. The virtual phone service may enable users of the service to engage in telecommunication activities using virtual phones while protecting such users from experiencing unlawful interception, interference, or harassment as a result of such telecommunication activities. For example, the telecommunication activities may include placing or receiving voice telephone calls, browsing the Internet, accessing email and instant messaging services, interacting with online social media websites, and/or so forth. In various embodiments, the virtual telephony service provider that operates the virtual telephony platform 102 may enable each user to customize a virtual phone service scheme that suits the user. The user may be an individual or an entity that is composed of multiple individual members.

In order to implement a virtual phone service scheme for a user, the virtual telephony service provider may initially deploy multiple modem array devices in one or more geographical regions (e.g., cities, states, countries, and/or so forth) based on the virtual phone service scheme requested by the user. For example, the virtual phone service scheme may call for the deployment of modem array devices 106 (1)-106(N) in various geographical regions so that the user may establish a corresponding virtual phone presence in each region. In turn, the virtual telephony service provider may purchase the requested modem array devices and deploy the devices in the requested geographical regions. A modem array device is a device that is equipped with multiple cellular modems (e.g., 32 modems). Each of the cellular modems in a modem array device is configured to use various radio access technologies (e.g., (Long-Term Evolution (LTE), 5G, etc.) to communicatively interact with the cellular base stations of wireless carrier networks in a geographical region. For example, the modems in the modem array device 106(1) may communicate with the base stations of one or more wireless carrier networks in a first geographical region (e.g., a base station 108(1)) via radio interface connections (e.g., a radio interface connection 110(1)). Likewise, the modems in the modem array device 106(2) may communicate with the base stations of one or more wireless carrier networks in a second geographical region (e.g., a base station 108(2)) via radio interface connections (e.g., a radio interface connection 110(2)). Further, the modems in the modem array device 106(2) may communicate with the base stations of one or more wireless carrier networks in a third geographical region (e.g., a base station 108(N)) via radio interface connections (e.g., a radio interface connection 110(N)).

As a part of the deployment, each modem array device may be networked to the virtual telephony platform 102 via a communication connection. In various embodiments, the communication connection is a secure connection, such as a virtual private network (VPN) connection. For example, the modem array device 106(1) may be connected to the virtual telephony platform 102 via a communication connection 112(1), the modem array device 106(2) may be connected to the virtual telephony platform 102 via a communication connection 112(2), and the modem array device 106(N) may be connected to the virtual telephony platform 102 via a communication connection 112(N). In various embodiments, each of the communication connections may be established using one or more networks. For example, such networks may include network elements of a cellular network, a local access network (LAN), a wide-area network (WAN), the Internet, and/or so forth. Thus, each modem array may act as a network gateway that communicatively connects the virtual telephony platform 102 to one or more corresponding publicly accessible wireless carrier networks in a geographical region.

As a part of the virtual phone service scheme, the user may have designated a particular set of subscriber identity modules (SIMs) for use with the one or more modem array devices to the virtual phone service provider that operates the virtual telephony platform 102. In various embodiments, the set of SIMs may include physical SIM cards that are purchased from SIM card vendors, virtual SIMs (e.g., eSIMs) that are purchased from virtual SIM vendors, or a combination of both physical SIM cards and virtual SIMs. In some embodiments, the virtual phone service provider may purchase the particular set of SIMs on behalf of the user. Each of the SIMs may include a SIM profile that is associated with a subscriber account established with a particular wireless carrier network (i.e., a Home Public Land Mobile Network (HPLMN)). Accordingly, the SIM profile may enable the user to access and use the telecommunication services provided by the HPLMN, as well as to access and use telecommunication services provided by various other wireless carrier networks (i.e., Visited Public Land Mobile Networks (VPLMNs)) around the globe. For example, the particular set of SIMs may include SIM profiles that are associated with subscriber accounts established with a single HPLMN, multiple HPLMNs in the same geographical region (e.g., country), or multiple HPLMNs in different geographical regions (e.g., different countries). Each SIM profile may store SIM profile data that is unique to the SIM profile. For example, the SIM profile data in a SIM profile may include a unique International Mobile Subscriber Identity (IMSI), subscriber authentication information, preferences, device characteristics, and settings for carrier access and services, and/or so forth.

In various embodiments, the virtual telephony platform 102 may store the particular set of SIMs associated with the user in a dedicated SIM bank device for use by the user. For example, the SIM bank device 114 may store multiple SIMs 116(1)-116(N) for the user. For physical SIM cards, a SIM bank device may include a plurality of SIM slots for accepting and communicatively coupling the physical SIM cards to the SIM bank device via electrically conductive connections. Accordingly, the SIM bank device may access and download the SIM profiles from the physical SIM cards. With respect to virtual SIMs, the SIM bank device may receive a transfer of the virtual SIMs from a computing device of the virtual SIM vendor over a network. In turn, the SIM bank device may store the SIM profiles of the virtual SIMs in a memory of the SIM bank device.

Following the deployment of the modem array devices and the set of SIMs for use, the user may use an application user interface of a virtual phone environment that is provided by the virtual telephony platform 102 to configure combinations of modems and SIM profiles into virtual phones that can be used for conducting telecommunication activities in one or more geographical regions. For example, the user may use an application user interface 118 that is provided by a client device 120 to access the virtual phone environment. The application user interface 118 may be an online user interface portal that is generated by the virtual telephony platform 102 and accessible via a web browser or a client application executing on the client device 120. The client device 120 may be connected to the virtual telephony platform 102 via a secure communication connection 122, such as a VPN connection. The secured communication connection may be established over one or more networks. For example, such networks may include network elements of a cellular network, a LAN, a WAN, the Internet, and/or so forth.

During the configuration of a virtual phone, the user may initially use an application user interface of the virtual phone environment to select a specific modem in a particular deployed modem device array for use. Subsequently, the user may use the application user interface to select a unique device profile from a device profile database 124 for provisioning to the particular modem. Each device profile may include a unique International Mobile Equipment Identity (IMEI), a unique device serial number, a device manufacturer identifier, a device model identifier, and/or so forth. By using the unique device profile, the particular modem may identify itself as a specific mobile telecommunication device to any wireless carrier network to which it communicatively connects. For example, the unique device profile may identify the particular modem as a model of an Android phone (e.g., a Samsung Galaxy phone), a model of an iPhone, or some other specific model of phone manufactured by a particular manufacturer. In some alternative embodiments, the virtual telephony platform 102 may automatically assign a unique device profile from the device profile database 124 to a specific modem when the user selects the modem. The virtual telephony platform 102 may use a communication connection to a corresponding modem array device to send the selected device profile to the selected modem for storage in a memory of the modem.

Additionally, the user may use the application user interface to select a specific SIM profile from a SIM bank device (e.g., the SIM bank device 114) for use by the selected modem. Following the selection of the SIM bank device, the virtual telephony platform 102 may use the communication connection to the corresponding modem array device to send the SIM profile data of the selected SIM profile to the selected modem. Accordingly, the selected modem may use the SIM profile data to access a base station of a wireless carrier network in the geographical region to which the modem array device is deployed. For example, as shown in FIG. 1, a modem 126 in the modem array device 106(1) may be provided with a unique device profile 128 from the device profile database 124, and the SIM profile 130 of the SIM 116(1), such that the modem 126 may act as a virtual phone with respect to the base station 108(1). While FIG. 1 illustrates that a user at a client device 120 may selectively provision a single virtual phone, the virtual telephony platform 102 may provide the user with the ability to provision multiple unique virtual phones for one or more geographical locations in a similar fashion.

Subsequently, the user may use software applications that are provided by the virtual telephony platform 102 via the virtual phone environment to engage in telecommunication activities with online services using a particular selected virtual phone. For example, the customized software applications may include a Voice over Internet Protocol (VOIP) telephony application for making and receiving telephone calls, a web browser for browsing the web, blogging to websites, uploading data to websites, and downloading data from websites, an email client application for accessing emails, an instant messaging client application for messaging, and/or so forth. The virtual phone environment may be a window, a desktop environment, an application screen, a web portal, or some graphical interface environment that is accessible to the user after user credentials of the user are verified. The user may access the virtual phone environment via the application user interface 118 provided at the client device 120.

In turn, continuing with the example of the modem 126 above, the virtual telephony platform 102 may route telecommunication data of such telecommunication activities between the client device 120 and the wireless carrier network of the base station 108(1) using the selected modem 126 and the selected SIM profile 130, regardless of the actual geographical location of the client device 120. For example, the client device 120 may be located in a different geographical region than the geographical region to which the modem 126 of the modem array device 106(1) is located. For example, the client device may be located in New York City, while the modem array device 106(1) may be located in Frankfurt, Germany. The telecommunication data may include voice communication data, instant messaging data, email communication data, web data, and/or so forth. In this way, a user may use the virtual telephony platform 102 to obscure a true geographical location of the user and manifest the user as being located in a different geographical region than the actual location of the user as the user engages in telecommunication activities.

Example Modem Array Device Components

Figure 2:
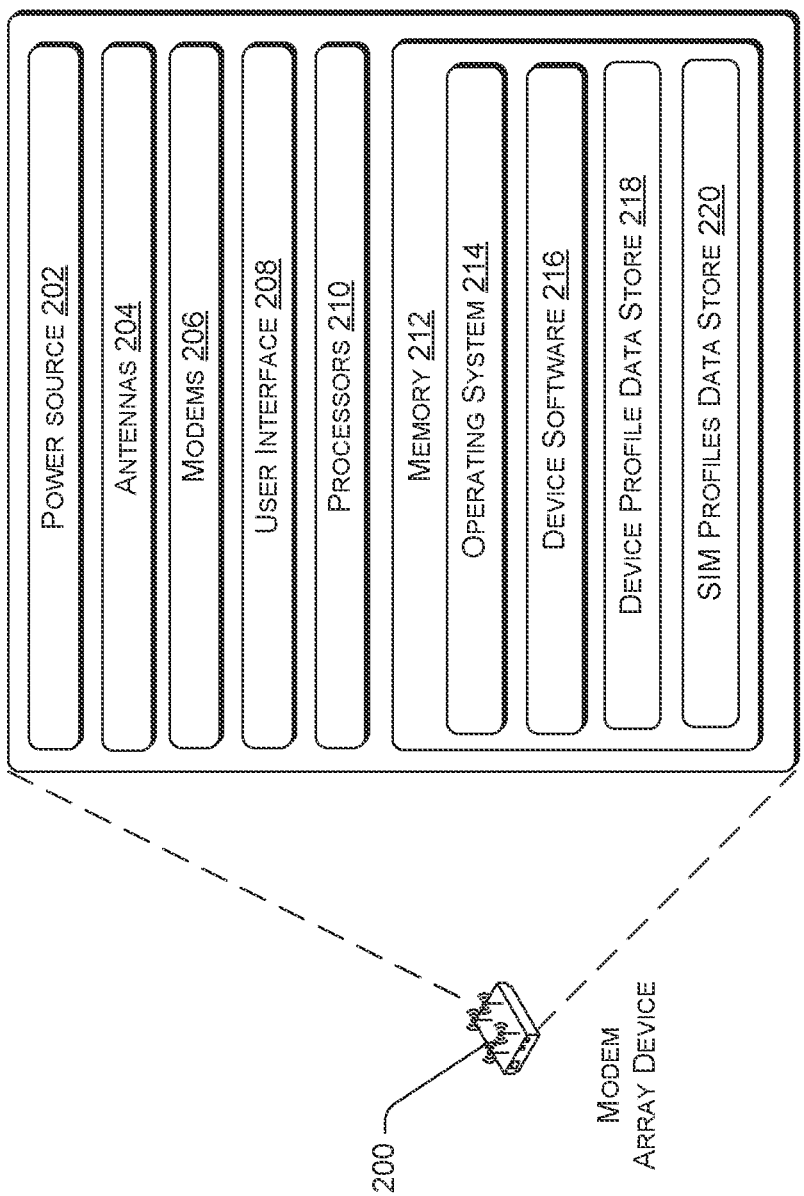
FIG. 2 is a block diagram showing various components of a modem array device that interacts with the virtual telephony platform.

FIG. 2 is a block diagram showing various components of a modem array device that interacts with the virtual telephony platform. The modem array device 200 may include a power source 202, antennas 204, modems 206, user interface 208, processors 210, and memory 212. The power source 202 may include a power circuitry that is capable of converting power from an external power source (e.g., an electrical outlet) into electrical power for powering the electrical components of the modem array device 200. Alternatively, or concurrently, the power source 202 may also include a rechargeable battery that is capable of supplying electrical power to the electrical components of the device.

The antennas 204 may support the transmission and reception of radio signals via the modems 206. In various embodiments, the antennas may include a Yagi antenna, a horn antenna, a dish reflector antenna, a slot antenna, a waveguide antenna, a Vivaldi antenna, a helix antenna, a planar antenna, a dipole array antenna, an origami antenna, and/or other types of antennas. In some instances, an antenna may be oriented to point to a particular direction via electrical beamforming and/or via mechanical movement of one or more elements of the antenna by an antenna controller.

The modems 206 may include multiple modems that are capable of encoding data into digital signals and decoding digital signals into data. Accordingly, each modem may include a radio frequency (RF) transceiver that modulates the digital signals into cellular radio signals for transmission via an antenna and demodulates cellular radio signals received via an antenna into digital signals. Each of the modems 206 may be further equipped with a baseband processor and/or other data processing components that generate communication data messages for enabling the modem to register and establish wireless communication connections with base stations of a wireless carrier network, as well as exchange telecommunication data with the base stations using the wireless communication connections. In various embodiments, such registration and communication may be performed based on SIM profile data (e.g., an IMSI) and device profile data (e.g., an IMEI). The user interface 208 may include one or more data output components (e.g., a visual display, an audio speaker), and one or more data input components. The data input components may include, but are not limited to, combinations of one or more of keypads, touch screens, and/or so forth.

The one or more processors 210 may perform additional data processing functions for the modem array device 200. In various embodiments, the processors 210 may include a single-core processor, a multi-core processor, a complex instruction set computing (CISC) processor, or another type of processor. The memory 212 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 210 and the memory 212 may implement an operating system 214. In turn, the operating system 214 may provide an execution environment for device software 216. The operating system 214 may include components that enable the modem array device 200 to receive and transmit data via various interfaces (e.g., user controls, radio transceivers, software-defined radio, and/or memory input/output devices), as well as process data using the processors 210 to generate output. The operating system 214 may include a presentation component that presents the output (e.g., display the data on an electronic display, store the data in memory, transmit the data to another electronic device, etc.). Additionally, the operating system 214 may include other components that perform various additional functions generally associated with an operating system.

The device software 216 may include software that facilitates the registration and establishment of wireless communication connections with base stations of wireless carrier networks, establish secure communication connections with other devices, processes telecommunication data received from originating devices via the communication connection for transmission via the modems, as well as processes data received via the modems for routing to recipient devices via the communication connection. The device software 216 may further include a modem configuration application that receives a device profile and corresponding configuration commands that assigns the device profile to a particular modem from the virtual telephony platform 102. Accordingly, the modem configuration application may store the received device profile in the memory 212 and assigns the device profile to the particular modem. For example, each of the modems in the modem array device 200 may have a unique port address, and the modem configuration application may associate the device profile with the port address of the particular modem. In this way, the particular modem may provide the device data in the device profile (e.g., the IMEI) to a wireless carrier network when communicating with a base station of the wireless carrier network.

Figure 3:
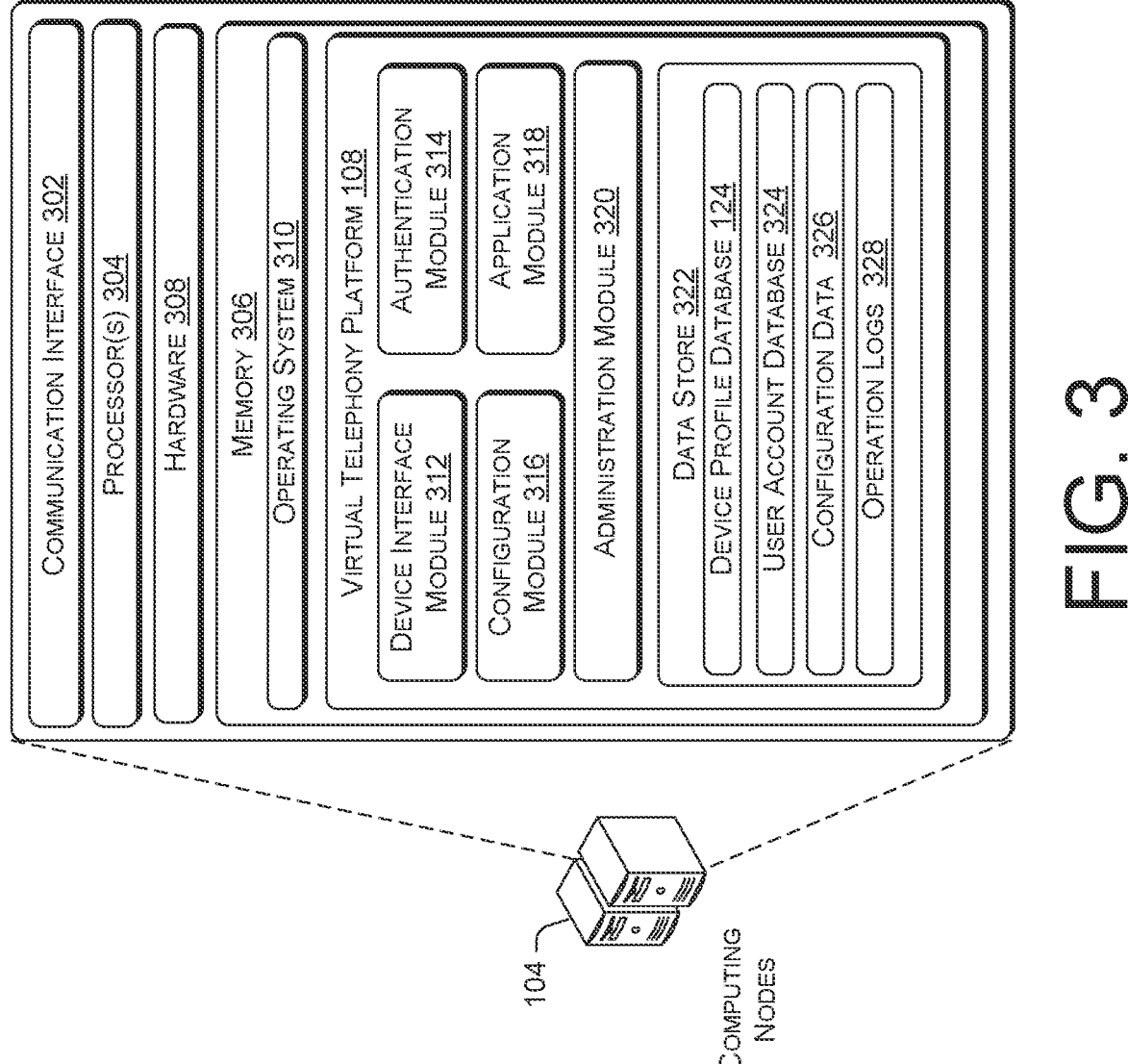
FIG. 3 is a block diagram showing various components of the virtual telephony platform that enables users to engage in secured telecommunication activities without revealing their geographical locations and identities.

Likewise, the modem configuration application may receive a SIM profile and corresponding configuration commands from the virtual telephony platform 102. Accordingly, the modem configuration application may store the received SIM profile in the memory 212 and assigns the SIM profile to the particular modem according to the configuration commands. For example, the modem configuration application may associate the SIM profile with the port address of the particular modem. In this way, the particular modem may provide the SIM profile data in the SIM profile (e.g., the IMSI) to a wireless carrier network when communicating with a base station of the wireless carrier network. Thus, the memory 212 may include a device profile data store 218 that stores received device profiles and a SIM profile data store 220 that stores received SIM profiles.
Example Virtual Telephony Platform Components FIG. 3 is a block diagram showing various components of the virtual telephony platform 102 that enables users to engage in secured telecommunication activities without revealing their geographical locations and identities. The virtual telephony platform 102 may be executed by the one or more computing nodes 104. The computing nodes 104 may include general-purpose computers, servers, or other electronic devices that are capable of receiving inputs, processing the inputs, and generating output data. In other embodiments, the computing nodes 104 may be virtual computing devices in the form of virtual machines or software containers that are hosted in a cloud.

The computing nodes 104 may include a communication interface 302, one or more processors 304, memory 306, and hardware 308. The communication interface 302 may include wireless and/or wired communication components that enable the computing nodes 104 to transmit data to and receive data from other networked devices. The hardware 308 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 304 and the memory 306 of the computing nodes 104 may implement an operating system 310. In turn, the operating system 310 may provide an execution environment for the virtual telephony platform 102. The operating system 310 may include components that enable the computing nodes 104 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The virtual telephony platform 102 may include a device interface module 312, an authentication module 314, a configuration module 316, an application module 318, and an administration module 320. The modules may include routines, program instructions, objects, and/or data structures that perform particular tasks or implement particular abstract data types. The memory 306 may also include a data store 322 that is used by the virtual telephony platform 102. The data store 322 may use various database technologies to store data, such as relational databases, object databases, object-relational databases, key-value databases, blob data storage, and/or so forth. The device profile database 124 may be stored in the data store 322.

The device interface module 312 may include components that enable the virtual telephony platform 102 to communicate with modem array devices and client devices (e.g., the client device 120) over secured communication connections. In various embodiments, the secured communication connections may include VPN connections that are established over one or more networks. For example, the device interface module 312 may provide secure data transfer or file transfer services that enable the transfer of device profiles and SIM profile data to the modem array devices.

In some embodiments, the device interface module 312 may include virtual desktop infrastructure (VDI) service components that enable remote access to applications and services of the virtual telephony platform 102 from a client device, such as the client device 120, through an application user interface in the form of a remote desktop. In other instances, the device interface module 312 may provide an online user interface portal that enables remote access to the applications and services of the virtual telephony platform 102. For example, the online user interface portal may include one or more web pages that enable an authorized user to interact with the applications and services. For example, the web pages may be in the form of HyperText Markup Language (HTML) documents, in which the documents may include text content, images, multimedia content, cascade style sheets (CSS), and/or scripts. The device interface module 312 may use an application server that supports server-side scripting via multiple scripting languages, such as Active Server Pages (ASP), Hypertext Preprocessor (PHP), JavaScript, and other scripting languages to support the dynamic generation of web pages based on user inputs. Accordingly, the device interface module 312 may provide virtual phone environments that enable users to configure and use virtual phones that are generated using the virtual telephony platform 102.

The authentication module 314 may enable a user to create or submit login credentials to establish a user account with the virtual telephony platform 102 The login credentials may include a user identifier, a user password, user biometric data, and/or so forth. The login credentials and other user registration information may be stored by the authentication module 314 in a user account database 324. Subsequently, the authentication module 314 may use the information stored in the user account database 324 to grant or deny user access to the online user interface portal. For example, the authentication module 314 may receive an input of login credentials via a login page of a virtual phone environment and grant the user access to the virtual phone environment when the inputted login credentials are validated against the information stored in the user account database 324. Each authorized user is granted access by the authentication module 314 to a corresponding virtual phone environment that enables the authorized user to solely configure and use virtual phones that are generated based on the SIM profiles and modem array devices that are deployed specifically for the user.

The configuration module 316 may receive selections of specific modems in particular modem array devices, selections of device profiles for provisioning to modems, and selections of SIM profiles for binding to modems. For example, an authorized user at a client device, e.g., the client device 120 may use an application user interface of a corresponding virtual phone environment to input the selections. In turn, the configuration module 316 may send the selected device profile and SIM profile data, along with the corresponding configuration commands, to a selected modem in a corresponding modem array device. The configuration commands may direct the device software in a modem array device to configure a modem using the selected device profile and SIM profile data. In turn, configuration module 316 may direct the device interface module 312 to send the selected device profile and SIM profile data along with the corresponding configuration commands to the modem array device to create a virtual phone for use. For example, each modem array device may be identified by a corresponding IP address, and each modem in a modem array device may be identified by a port address. As such, the configuration module 316 may route the profile data to a specific modem via a modem identifier that includes a specific device IP address and a specific modem port address. The various configurations performed by the configuration module 316 based on user selections may be stored as configuration data 326 in the data store 322.

In other embodiments, the configuration module 316 may also receive user requests to deprovision a virtual phone by dissociating the hardware and software components of the virtual phone. Such disassociation frees up each hardware or software component for association with other corresponding software and/or hardware components to create new virtual phones based on inputted user selections. The user requests may be inputted by a user at a client device, such as the client device 120, via a configuration interface of the virtual phone environment. For example, the configuration module 316 may receive a request to terminate a binding of a specific SIM profile from a particular modem. Accordingly, the configuration module 316 may send a configuration command to a corresponding modem array device to terminate the binding of the SIM profile from the particular modem. For example, the configuration command may cause the device software of the modem array device to dissociate the SIM profile from the port address of the modem and delete the SIM profile from a memory sector of the modem array device that stores the SIM profile for use by the modem.

In another example, the configuration module 316 may receive a request to disassociate a device profile from the particular modem. Accordingly, the configuration module 316 may send a configuration command to a corresponding modem array device to deprovision the device profile from the particular modem. For example, the configuration command may cause the device software of the modem array device to dissociate the SIM profile from the port address of the modem and delete the device profile from a memory sector of the modem array device that stores the device profile for use by the modem.

The application module 318 may provide software applications that are accessible through a virtual phone environment such that an authorized user may perform telecommunication activities with online services via the applications. For example, the software applications may include a VOIP telephony application for making and receiving telephone calls, a web browser for browsing the web, blogging to websites, uploading data to websites, and downloading data from websites, etc., an email client application for accessing emails, an instant messaging client application for messaging, and/or so forth. In various embodiments, the software applications may provide selection controls that enable a user to select a particular virtual phone from multiple available provisioned virtual phones to route the associated telecommunication data resulting from telecommunication activities conducted using the software applications. Thus, the telecommunication data that is associated with each software application may be routed through a virtual phone that is designated by the user to route such telecommunication data.

The administration module 320 may provide user control interfaces for an administrator to configure and monitor the operations of the virtual telephony platform 102. In some instances, the administration module 320 may provide controls that enable the administrator to associate one or more deployed modem array devices and one or more acquired sets of SIM profiles with a user account of a specific user. By using the user control interfaces provided by the administration module 320, the administrator may also permit specific users and/or their agents to establish user accounts with the virtual telephony platform, as well as perform management functions with respect to the user accounts. For example, the management functions may include modifying user access privileges with respect to the functions provided by the platform or terminating user access privileges. In other instances, the controls may also enable the administrator to select device profiles from the device profile database 124 and assign device profiles to modems that are in the modem array devices. In additional instances, the administration module 320 may also provide monitoring or auditing tools that store and generate operation logs 328 with respect to the configuration and usage activities performed by users using the virtual telephony platform 102. Furthermore, the administration module 320 may enable the administrator or an authorized user of the virtual telephony platform 102 to track and audit historical configuration and usage activities performed by the authorized user using the functions of the virtual telephony platform 102.

Example Processes

FIGS. 4 and 5 present illustrative processes 400 and 500 for configuring and using a virtual telephony platform that enables users to engage in secured telecommunication activities without revealing their geographical locations and identities. Each of the processes 400 and 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400 and 500 are described with reference to the architecture 100 of FIG. 1.

FIG. 4 is a flow diagram of an example process 400 for using the virtual telephony platform to configure a particular modem of a modem array device and a specific SIM profile into a virtual phone for use by a user. At block 402, the virtual telephony platform 102 may establish at least one communication connection between one or more modem array devices that are deployed in one or more geographical regions. A modem array device is a device that is equipped with multiple cellular modems. Each of the cellular modems is configured to use various radio access technologies (e.g., LTE, 5G, etc.) to communicatively interact with the cellular base stations of wireless carrier networks in a geographical region. In various embodiments, the communication connection is a secure connection, such as a virtual private network (VPN) connection.

At block 404, the virtual telephony platform 102 may be provided with access to multiple SIMs that are configured to provide access to wireless carrier networks. In various embodiments, the virtual telephony platform 102 may store a particular set of SIMs associated with the user in a dedicated SIM bank device for use by the user. The SIMs may include physical SIM cards and/or virtual SIMs.

At block 406, the virtual telephony platform 102 may receive a selection of a particular modem of a specific modem array device deployed in a particular geographical region. In various embodiments, the selection may be received from a user via an application user interface of a virtual phone environment that is provided by the virtual telephony platform 102. At block 408, the virtual telephony platform 102 may receive a selection of a unique device profile for association with the particular modem of the specific modem array device deployed in the particular geographical region. In various embodiments, the selection may be received from a user via an application user interface of a virtual phone environment that is provided by the virtual telephony platform 102.

At block 410, the virtual telephony platform 102 may provision the unique device profile to the particular modem in the specific modem array device deployed in the particular geographical region through a communication connection. The unique device profile may include a unique IMEI, a unique device serial number, a device manufacturer identifier, a device model identifier, and/or so forth.

At block 412, the virtual telephony platform 102 may receive a selection of particular SIM of the multiple SIMs for use with the particular modem. In various embodiments, the selection may be received from a user via an application user interface of the virtual phone environment that is provided by the virtual telephony platform 102. At block 414, the virtual telephony platform 102 may provide the particular modem with a specific SIM profile of the particular SIM of the multiple SIMs through the communication connection. The SIM profile data in a SIM profile may include a unique IMSI, subscriber authentication information, preferences and settings for carrier access and services, and/or so forth.

At block 416, the virtual telephony platform 102 may route telecommunication data between a client device and a wireless carrier network in the particular geographical region through the particular modem that is configured with the unique device profile and the specific SIM profile data of the particular SIM. In various embodiments, the telecommunication data may be associated with telecommunication activities conducted by a user using the virtual phone. For example, a user may be using software applications that are provided by the virtual telephony platform 102 via the virtual phone environment to engage in telecommunication activities with online services.

FIG. 5 is a flow diagram of an example process 500 for deprovisioning a virtual phone by dissociating components of the virtual phone via the virtual telephony platform. At block 502, the virtual telephony platform 102 may receive a request to terminate a binding of the specific SIM profile of the particular SIM to the particular modem. In various embodiments, the request may be received from a user via an application user interface of the virtual phone environment that is provided by the virtual telephony platform 102 or from an administrator of the platform via an administrative user interface. At block 504, the virtual telephony platform 102 may terminate the binding of the specific SIM profile of the particular SIM to the particular modem. For example, the virtual telephony platform 102 may send a configuration command to a corresponding modem array device to terminate the binding of the SIM profile from the particular modem. The configuration command may cause the device software of the modem array device to dissociate the SIM profile from the port address of the modem and delete the SIM profile from a memory sector of the modem array device that stores the SIM profile for use by the modem.

At block 506, the virtual telephony platform 102 may receive a request to dissociate the unique device profile from the particular modem. In various embodiments, the request may be received from a user via an application user interface of the virtual phone environment that is provided by the virtual telephony platform 102 or from an administrator of the platform via an administrative user interface. At block 508, the virtual telephony platform 102 may deprovision the unique device profile from the particular modem. For example, the virtual telephony platform may send a configuration command to a corresponding modem array device to deprovision the device profile from the particular modem. The configuration command may cause the device software of the modem array device to dissociate the SIM profile from the port address of the modem and delete the device profile from a memory sector of the modem array device that stores the device profile for use by the modem.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a virtual telephony platform storing computer-executable instructions that upon execution cause one or more processors to perform acts comprising:

establishing at least one communication connection between one or more multiple modem array devices that are deployed in one or more geographical regions and a virtual telephony platform, wherein each modem array device includes multiple cellular telecommunication modems that communicatively connect to one or more base stations of a corresponding wireless carrier network in a corresponding geographical region;

providing the virtual telephony platform with access to multiple Subscriber Identity Modules (SIMs) that are configured to access wireless carrier networks;

receiving, at the virtual telephony platform from a client device, a specific SIM profile of a particular SIM of the multiple SIMs;

receiving, at the virtual telephony platform from the client device, a unique device profile;

configuring a combination of the particular modem, the unique device profile, and the specific SIM profile into a virtual phone accessible to the client device, identified with the unique device profile, to connect to one of the one or more base stations;

sending, from the virtual telephony platform for provisioning to the particular modem in a specific modem array device deployed in a particular geographical region through a communication connection, the unique device profile for storage in a memory of the particular modem;

providing, via the virtual telephony platform, the particular modem with the specific SIM profile through a corresponding communication connection such that the particular modem is configured to use the specific SIM profile to access a base station of a wireless carrier in the particular region on behalf of the client device; and routing, via the virtual telephony platform, telecommunication data between the client device and a wireless carrier network in the particular region through the virtual phone, manifesting the client device as being located in a different geographical region than the actual location of the client device as the client device engages in telecommunication activities over the wireless carrier network.

2. The one or more non-transitory computer-readable media of claim 1, wherein the provisioning the unique device profile and providing the specific SIM profile includes provisioning the unique device profile and providing the specific SIM profile of the particular SIM in response to receiving a selection of the particular SIM for use with the particular modem.

3. The one or more non-transitory computer-readable media of claim 1, wherein providing the virtual telephony platform with access to the multiple SIMs includes connecting multiple physical SIM cards to a SIM bank device that is accessible to the virtual telephony platform or storing multiple virtual SIMs in a memory of the SIM bank device to enable the virtual telephony platform to access SIM profiles stored in the physical SIM cards.

4. The one or more non-transitory computer-readable media of claim 3, wherein the SIM bank device is a component of a modem array device.

5. The one or more non-transitory computer-readable media of claim 3, wherein the SIM bank device is located in a geographical region that is different from the particular geographical region of the specific modem array.

6. The one or more non-transitory computer-readable media of claim 1, wherein the client device is located in a geographical region that is different from the particular geographical region of the specific modem array device.

7. The one or more non-transitory computer-readable media of claim 1, wherein the unique device profile includes at least one of a unique International Mobile Equipment Identity (IMEI), a device manufacturer identifier, or a device model identifier.

8. The one or more non-transitory computer-readable media of claim 1, wherein the specific SIM profile includes a unique International Mobile Subscriber Identity (IMSI) that is associated with a corresponding wireless subscriber account.

9. The one or more non-transitory computer-readable media of claim 1, wherein the at least one communication connection includes a virtual private network (VPN) connection between the particular modem and the virtual telephony platform.

10. The one or more non-transitory computer-readable media of claim 1, wherein the provisioning the unique device profile includes provisioning the unique device profile to the particular modem in response to receiving a selection of the unique device profile for association with the particular modem at the virtual telephony platform.

11. The one or more non-transitory computer-readable media of claim 1, wherein the acts further comprise:

receiving, at the virtual telephony platform, a request to terminate a binding of the specific SIM profile of the particular SIM to the particular modem; and terminating, via the virtual telephony platform, the binding of the specific SIM profile of the particular SIM to the particular modem.

12. The one or more non-transitory computer-readable media of claim 1, wherein the acts further comprise:

receiving, at the virtual telephony platform, a request to disassociate the unique device profile from the particular modem; and deprovisioning, via the virtual telephony platform, the unique device profile from the particular modem.

13. A method, comprising:

establishing communication connections between multiple modem array devices that are deployed in multiple geographical regions and a virtual telephony platform, wherein each modem array device includes multiple cellular telecommunication modems that communicatively connect to one or more base stations of a corresponding wireless carrier network in a corresponding geographical region;

providing the virtual telephony platform with access to multiple Subscriber Identity Modules (SIMs) that are configured to access wireless carrier networks;

receiving, at the virtual telephony platform from a client device, a specific SIM profile of a particular SIM of the multiple SIMs;

receiving, at the virtual telephony platform from the client device, a unique device profile;

receiving, at the virtual telephony platform from the client device, a selection of a particular SIM of the multiple SIMs for use with a particular modem in a specific modem array device deployed in a particular geographical region;

configuring a combination of the particular modem, the unique device profile, and the specific SIM profile into a virtual phone accessible to the client device, identified with the unique device profile, to connect to one of the one or more base stations;

in response to receiving the selection of the particular SIM for use with the particular modem:

sending, from the virtual telephony platform for provisioning to the particular modem in the specific modem array deployed in the particular geographical region through a corresponding communication connection, the unique device profile for storage in a memory of the particular modem; and providing, via the virtual telephony platform, the particular modem with the specific SIM profile through a corresponding communication connection such that the particular modem is configured to use the specific SIM profile to access a base station of a wireless carrier in the particular geographical region on behalf of the client device; and routing, via the virtual telephony platform, telecommunication data between the client device and a wireless carrier network in the particular geographical region through the virtual phone, manifesting the client device as being located in a different geographical region than the actual location of the client device as the client device engages in telecommunication activities over the wireless carrier network.

14. The method of claim 13, wherein providing the virtual telephony platform with access to the multiple SIMs includes connecting multiple physical SIM cards to a SIM bank device that is accessible to the virtual telephony platform or storing multiple virtual SIMs in a memory of the SIM bank device to enable the virtual telephony platform to access SIM profiles stored in the physical SIM cards.

15. The method of claim 14, wherein the SIM bank device is located in a geographical region that is different from the particular geographical region of the specific modem array.

16. The method of claim 13, further comprising:

receiving, at the virtual telephony platform, a request to terminate a binding of the specific SIM profile of the particular SIM to the particular modem; and terminating, via the virtual telephony platform, the binding of the specific SIM profile of the particular SIM to the particular modem.

17. The method of claim 13, further comprising:

receiving, at the virtual telephony platform, a request to disassociate the unique device profile from the particular modem; and deprovisioning, via the virtual telephony platform, the unique device profile from the particular modem.

18. A system, comprising:

one or more processors; and memory including a plurality of computer-executable components that are executable by the one or more processors to perform a plurality of actions, the plurality of actions comprising:

establishing at least one communication connection between one or more multiple modem array devices that are deployed in one or more geographical regions and a virtual telephony platform, wherein each modem array device includes multiple cellular telecommunication modems that communicatively connect to one or more base stations of a corresponding wireless carrier network in a corresponding geographical region;

providing the virtual telephony platform with access to multiple Subscriber Identity Modules (SIMs) that are configured to access wireless carrier networks;

receiving, at the virtual telephony platform from a client device, a specific SIM profile of a particular SIM of the multiple SIMs;

receiving, at the virtual telephony platform from the client device, a unique device profile;

configuring a combination of the particular modem, the unique device profile, and the specific SIM profile into a virtual phone accessible to the client device, identified with the unique device profile, to connect to one of the one or more base stations;

sending, from the virtual telephony platform for provisioning to the particular modem in a specific modem array device deployed in a particular geographical region through a communication connection, the unique device profile for storage in a memory of the particular modem;

providing, via the virtual telephony platform, the particular modem with the specific SIM profile through a corresponding communication connection such that the particular modem is configured to use the specific SIM profile to access a base station of a wireless carrier in the particular region on behalf of the client device; and routing, via the virtual telephony platform, telecommunication data between the client device and a wireless carrier network in the particular region through the virtual phone, manifesting the client device as being located in a different geographical region than the actual location of the client device as the client device engages in telecommunication activities over the wireless carrier network.

19. The system of claim 18, wherein the provisioning the unique device profile and providing the specific SIM profile includes provisioning the unique device profile and providing the specific SIM profile of the particular SIM in response to receiving a selection of the particular SIM for use with the particular modem.

* * * * *